United States Patent
Yim et al.

(10) Patent No.: US 8,676,924 B2
(45) Date of Patent: Mar. 18, 2014

(54) SERVER AND SIMULTANEOUS ACCESS CONTROL METHOD THEREOF

(75) Inventors: Jung-kil Yim, Seongnam-si (KR); Chan-hoo Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 909 days.

(21) Appl. No.: 11/835,007

(22) Filed: Aug. 7, 2007

(65) Prior Publication Data

US 2008/0170589 A1    Jul. 17, 2008

(30) Foreign Application Priority Data

Jan. 16, 2007   (KR) .................. 10-2007-0004815

(51) Int. Cl.
*G06F 15/16* (2006.01)
*G06F 15/173* (2006.01)

(52) U.S. Cl.
USPC ............ 709/217; 709/203; 709/224; 709/226

(58) Field of Classification Search
USPC .................................................. 709/226, 217
See application file for complete search history.

(56) References Cited

U.S. PATENT DOCUMENTS

| | | | | |
|---|---|---|---|---|
| 5,905,872 A * | 5/1999 | DeSimone et al. | ........... | 709/245 |
| 6,002,852 A * | 12/1999 | Birdwell et al. | ........... | 709/203 |
| 6,038,601 A * | 3/2000 | Lambert et al. | ........... | 709/226 |
| 6,324,570 B1 * | 11/2001 | Tonchev et al. | ........... | 709/207 |
| 6,574,477 B1 * | 6/2003 | Rathunde | ........... | 455/453 |
| 7,111,061 B2 * | 9/2006 | Leighton et al. | ........... | 709/224 |
| 7,225,264 B2 * | 5/2007 | Croman et al. | ........... | 709/232 |
| 7,328,049 B2 * | 2/2008 | Chanut | ........... | 455/574 |
| 7,346,682 B2 * | 3/2008 | Basani et al. | ........... | 709/224 |
| 7,353,267 B1 * | 4/2008 | Cunningham et al. | ........ | 709/224 |
| 7,502,994 B2 * | 3/2009 | Kocol | ........... | 715/205 |
| 7,562,112 B2 * | 7/2009 | Harrow et al. | ........... | 709/203 |
| 7,562,153 B2 * | 7/2009 | Biliris et al. | ........... | 709/238 |
| 7,574,515 B2 * | 8/2009 | Fontijn et al. | ........... | 709/232 |
| 7,613,780 B2 * | 11/2009 | DeSalvo | ........... | 709/206 |
| 7,706,740 B2 * | 4/2010 | Collins et al. | ........... | 455/3.01 |
| 7,721,103 B2 * | 5/2010 | Risan et al. | ........... | 713/176 |
| 7,752,258 B2 * | 7/2010 | Lewin et al. | ........... | 709/203 |
| 7,779,097 B2 * | 8/2010 | Lamkin et al. | ........... | 709/223 |
| 7,840,437 B2 * | 11/2010 | Lewis | ........... | 705/14.26 |
| 7,930,340 B2 * | 4/2011 | Arunachalam | ........... | 709/203 |
| 7,975,043 B2 * | 7/2011 | Douglas et al. | ........... | 709/224 |
| 7,979,880 B2 * | 7/2011 | Hosea et al. | ........... | 725/46 |

(Continued)

FOREIGN PATENT DOCUMENTS

KR   10-2003-0021363 A    3/2003

OTHER PUBLICATIONS

Biliris, Alexandros et al. "CDN Brokering," Computer Communications, vol. 25, Issue 4, Mar. 1, 2002, pp. 393-402.*

(Continued)

*Primary Examiner* — Melvin H Pollack

(74) *Attorney, Agent, or Firm* — Stein IP, LLC

(57) ABSTRACT

A server and a simultaneous access control method, the server including: a connector to receive data from and transmit data to a plurality of clients; and a connection manager to extract a simultaneously accessible client from among the plurality of clients, and to permit access to the extracted client, if the plurality of clients request access to the server. Therefore, effective network traffic can be provided.

9 Claims, 4 Drawing Sheets

(56) References Cited

U.S. PATENT DOCUMENTS

| | | | |
|---|---|---|---|
| 7,986,686 B2* | 7/2011 | Nadeau et al. | 370/386 |
| 8,024,186 B1* | 9/2011 | De Bonet | 704/238 |
| 8,122,128 B2* | 2/2012 | Burke et al. | 709/225 |
| 8,200,775 B2* | 6/2012 | Moore | 709/217 |
| 2001/0010059 A1* | 7/2001 | Burman et al. | 709/224 |
| 2003/0074520 A1* | 4/2003 | Weber | 711/105 |
| 2003/0120705 A1* | 6/2003 | Chen et al. | 709/104 |
| 2004/0002367 A1* | 1/2004 | Chanut | 455/574 |
| 2005/0058138 A1* | 3/2005 | Bucher et al. | 370/395.42 |
| 2005/0091364 A1* | 4/2005 | Bantz et al. | 709/224 |
| 2007/0033588 A1* | 2/2007 | Landsman | 717/178 |
| 2007/0083527 A1* | 4/2007 | Wadler et al. | 707/10 |
| 2007/0276951 A1* | 11/2007 | Riggs et al. | 709/229 |
| 2008/0294899 A1* | 11/2008 | Gazzetta et al. | 713/170 |

OTHER PUBLICATIONS

Wauters, T. et al. "Load Balancing Through Efficient Distributed Content Placement," Next Generation Internet Networks, Apr. 20, 2005, pp. 95-105.*

Wang, Limin et al. "The Effectiveness of Request Redirection on CDN Robustness," vol. 36, Issue SI, Winter 2002, pp. 345-360.*

Korean Office Action issued Sep. 4, 2013, issued in corresponding Korean Patent Application No. 10-2007-0004815.

\* cited by examiner

SERVER AND SIMULTANEOUS ACCESS CONTROL METHOD THEREOF

CROSS-REFERENCE TO RELATED APPLICATION

This application claims the benefit of Korean Application No. 2007-4815 filed on Jan. 16, 2007 in the Korean Intellectual Property Office, the disclosure of which is incorporated herein by reference.

BACKGROUND OF THE INVENTION

1. Field of the Invention

Aspects of the present invention relate to a server and a simultaneous access control method thereof, and more particularly, to a server and a simultaneous access control method thereof in which efficient network traffic can be provided by distributing access to the plurality of clients.

2. Description of the Related Art

Generally, content transmission systems include a single server to provide content, and a plurality of clients to receive content. Specifically, content transmission systems include clients, Content Management System (CMS) servers to manage meta information relating to provided content, Content Delivery System (CDS) servers to manage information relating to downloading content and relating to whether downloading is completed, and Content Delivery Network (CDN) content servers to store content. The clients, which may be set top boxes, communicate with the CDS servers and CDN content servers to download and display content.

Each of the plurality of clients periodically receives a content download list from the CDS server, accesses the CDN content server, and downloads content. Additionally, each of the plurality of clients displays the downloaded content. In this situation, if the plurality of clients simultaneously request access, a load may result in the CDN content server.

Accordingly, when the network bandwidth of the server increases in order to solve the problem, the content maintenance cost may also increase. The content maintenance cost is a value obtained by adding the network cost to the storage cost. The network cost is computed by multiplying the average of the maximum access amount for a day by the traffic unit cost.

Similarly, even if a separate download server is provided for the plurality of clients to download content, the content maintenance cost required to establish the separate download server may also increase.

Furthermore, when the plurality of clients is divided into groups and download content at different times, each client has a different network state. Accordingly, if the time difference for each group is not great, the access amount for a day may increase due to different times for each group, and thus it is difficult to efficiently manage the network traffic.

SUMMARY OF THE INVENTION

Aspects of the present invention relate to a server and a simultaneous access control method thereof, in which efficient network traffic can be provided by distributing access to the plurality of clients.

According to an aspect of the present invention, there is provided a server including: a connector to receive data from and transmit data to a plurality of clients; and a connection manager to extract a simultaneously accessible client from among the plurality of clients, and to permit access by the extracted client, if the plurality of clients request access.

The connection manager may include a connection management controller to control the connector to transmit a download list, in which content header information is recorded, to the plurality of clients, if the plurality of clients request access, and to receive content download completion information from the clients.

The connection manager may further include an arranging part to arrange the plurality of clients in order of transmission speed, based on transmission speeds contained in the download completion information; and an extractor to extract a simultaneous access-granting group by grouping the plurality of the arranged clients in order of transmission speed, based on a simultaneous access permission level.

The connection management controller may control the connector to transmit a download list, in which content body information is recorded, to clients contained in the extracted simultaneous access-granting group, if the clients contained in the simultaneous access-granting group request access.

The connection management controller may control the extractor to add to the simultaneous access-granting group a client having high transmission speed from among clients not included in the simultaneous access-granting group, if the download completion information on the content is received from one client of the simultaneous access-granting group.

According to another aspect of the invention, there is provided a simultaneous access control method of a server, the method including: receiving an access request from a plurality of clients; extracting a simultaneously accessible client from among the plurality of clients; and permitting access by the extracted client.

The method may further include: transmitting a download list, in which content header information is recorded, to the plurality of clients; and receiving download completion information regarding the content from the clients.

The extracting of the simultaneously accessible client may include: arranging the plurality of clients in order of transmission speed, based on transmission speeds contained in the download completion information; and extracting a simultaneous access-granting group by grouping the plurality of the arranged clients in order of transmission speed, based on a simultaneous access permission level.

The method may further include transmitting a download list, in which content body information is recorded, to clients contained in the extracted simultaneous access-granting group.

The method may further include: receiving the download completion information on the content from one client selected from the simultaneous access-granting group; and adding to the simultaneous access-granting group a client having a high transmission speed from among clients not included in the simultaneous access-granting group.

According to another aspect of the present invention, there is provided a computer readable recording medium encoded with the method and implemented by a computer.

According to yet another aspect of the present invention, there is provided a simultaneous access control method of a server, the method including: receiving an access request from a plurality of clients; determining a transmission speed of each of the plurality of clients; arranging the plurality of clients according to the transmission speeds; and extracting a simultaneous access-granting group of clients from the arranged plurality of clients based on a simultaneous access permission level.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
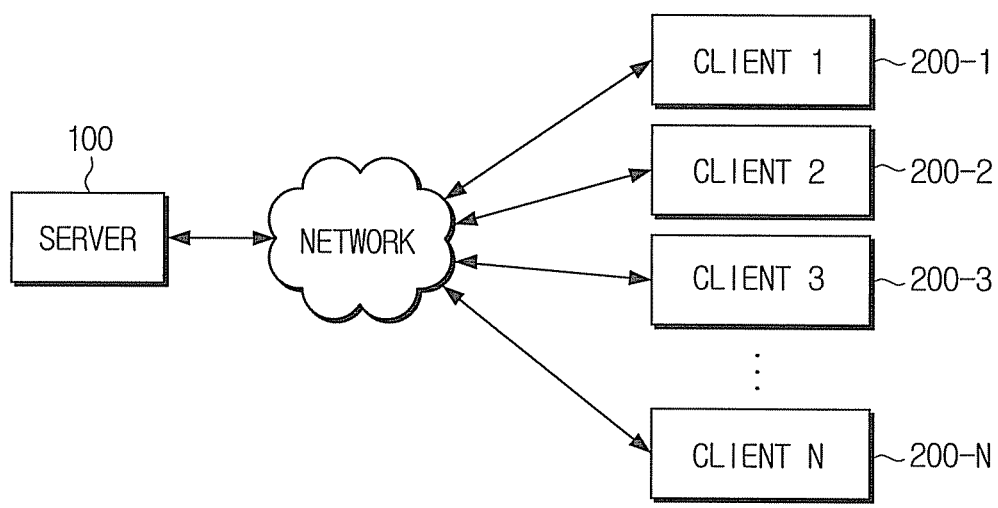
FIG. 1 is a block diagram of a content transmission system including a server according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a content transmission system including a server according to an embodiment of the present invention. In FIG. 1, the content transmission system includes a server 100 and a plurality of clients 200-1, 200-2, 200-3, ..., 200-N. The server 100 is connected to the plurality of clients 200-1, 200-2, 200-3, ..., 200-N through a network.

If the plurality of clients 200-1, 200-2, 200-3, ..., 200-N request access to the server 100, the server 100 may extract (or select) simultaneously accessible clients from among the plurality of clients 200-1, 200-2, 200-3, ..., 200-N, and permit access to the extracted clients. For example, if an access request signal is received from the plurality of clients 200-1, 200-2, 200-3, ..., 200-N, the server 100 may extract (or select) simultaneously accessible clients according to the transmission speeds of the plurality of clients 200-1, 200-2, 200-3, ..., 200-N. The server 100 may be a Content Delivery Service (CDS) server. However, it is understood that the server 100 may be of any type capable of managing client access. For example, the server 100 may be both a content server and a CDS server (i.e., a content server capable of performing the functions of a CDS server).

Additionally, the server 100 may transmit, to the plurality of clients 200-1, 200-2, 200-3, ..., 200-N, a download list including content that can be downloaded from a content server (for example, a Content Delivery Network (CDN) server). Here, predetermined content is stored in the content server. Accordingly, the extracted client may access the content server (not shown). As stated above, it is understood that the server 100 may be the content server. That is, the server 100 may have the functionalities of both a CDS server and a content server. Furthermore, predetermined content may be stored in a plurality of content servers, and the server 100 may be one of the plurality of content servers having the functionalities of both a CDS server and a content server.

According to an aspect of the present invention, the server 100 enables access to the clients, or informs the clients that access is enabled thereto, by transmitting the download list to the accessible clients. In other words, among the plurality of clients 200-1, 200-2, 200-3, ..., 200-N, only a client to which the download list is transmitted by the server 100 may access the content server and download content. However, it is understood that according to other aspects, the server 100 may enable access to the clients using other methods, such as transmitting an access key or a message informing the accessible clients that access is enabled.

Each of the plurality of clients 200-1, 200-2, 200-3, ..., 200-N may request access to the server 100. The access request may be periodically performed. Accordingly, each of the plurality of clients 200-1, 200-2, 200-3, ..., 200-N may eventually receive the download list from the server 100.

Next, each of the plurality of clients 200-1, 200-2, 200-3, ..., 200-N may, once receiving the download list from the server 100, download content from the content server (not shown) based on the received download list. When content is completely downloaded, each of the plurality of clients 200-1, 200-2, 200-3, ..., 200-N may transmit download completion information to the server 100. For example, the plurality of clients 200-1, 200-2, 200-3, ..., 200-N may measure the download transmission speed after downloading content and add the measured transmission speed to the download completion information transmitted to the server 100.

The transmission speeds may be measured using a protocol (such as ping), or, alternatively, by using the downloaded content size and the time required to download (that is, transmission speed=content size/time required to download). Accordingly, the plurality of clients 200-1, 200-2, 200-3, ..., 200-N may measure the download transmission speed periodically or randomly.

Figure 2:
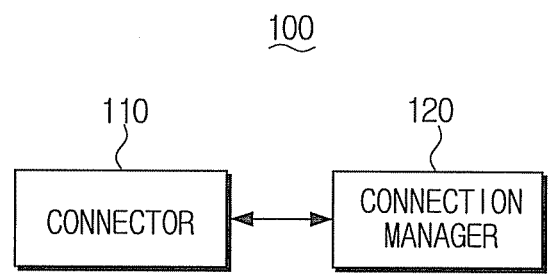
FIG. 2 is a detailed block diagram of the server according to an embodiment of the present invention.

FIG. 2 is a detailed block diagram of the server of FIG. 1. Referring to FIGS. 1 and 2, the server 100 includes a connector 110 and a connection manager 120.

The connector 110 may receive data from and transmit data to the plurality of clients 200-1, 200-2, 200-3, ..., 200-N. Specifically, the connector 110 may receive the access request signal and the download completion information from each of the plurality of clients 200-1, 200-2, 200-3, ..., 200-N. Additionally, the connector 110 may transmit the download list to the plurality of clients 200-1, 200-2, 200-3, ..., 200-N.

If the plurality of clients 200-1, 200-2, 200-3, ..., 200-N request access, the connection manager 120 may extract the simultaneously accessible clients from among the plurality of clients 200-1, 200-2, 200-3, ..., 200-N, and permit access to the extracted clients. Specifically, if the plurality of clients 200-1, 200-2, 200-3, ..., 200-N request access, the connection manager 120 may arrange the plurality of clients 200-1, 200-2, 200-3, ..., 200-N according to the transmission speeds of the clients 200-1, 200-2, 200-3, ..., 200-N, and extract the simultaneously accessible clients.

In addition, the connection manager 120 may transmit the download list to the extracted clients. Thus, only the client receiving the download list may access the content server (not shown) to download content. However, it is understood that the connection manager 120 may use other methods to allow access to the content server, such a transmitting an access key.

If a user adds content to the content server (not shown), the connection manager 120 may update the content download list. Accordingly, the connection manager 120 may transmit the updated download list to the plurality of clients 200-1, 200-2, 200-3, ..., 200-N. Furthermore, the connection manager 120 may compare the download list to the updated download list and transmit only the download list of added content. Alternatively, the previously received download list and the updated download list may be compared by the client receiving the updated download list, and only newly added content may be downloaded from the content server (not shown).

Figure 3:
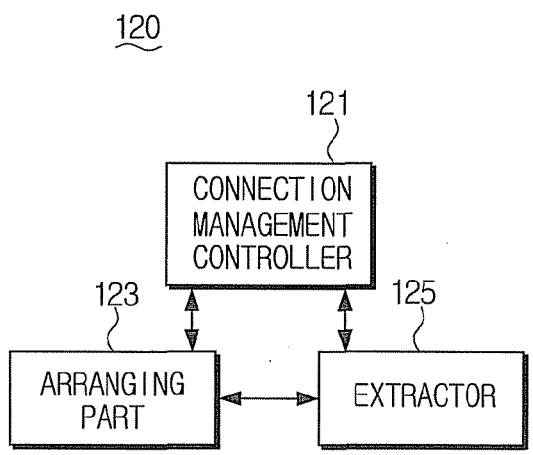
FIG. 3 is a detailed block diagram of a connection manager according to an embodiment of the present invention.

FIG. 3 is a detailed block diagram of the connection manager illustrated in FIG. 2. Referring to FIGS. 2 and 3, the connection manager 120 includes a connection management controller 121, an arranging part 123, and an extractor 125.

If the plurality of clients 200-1, 200-2, 200-3, . . . , 200-N request access, the connection management controller 121 controls the connector 110 to transmit a download list to the plurality of clients 200-1, 200-2, 200-3, . . . , 200-N. The download list may include only content header information. The content header information is information about a portion of content. That is, the connection management controller 121 informs the clients 200-1, 200-2, 200-3, . . . , 200-N of the content header information, and the clients 200-1, 200-2, 200-3, . . . , 200-N then download the corresponding portion of the content based on the content header information. As a result, it is possible to quickly measure the transmission speeds. The connection management controller 121 controls the connector 110 to receive the download completion information of content from the plurality of clients 200-1, 200-2, 200-3, . . . , 200-N in order to measure the transmission speeds. However, it is understood that according to other aspects, the connection management controller 121 may measure or determine the transmission speeds according to other methods, such as using a protocol (for example, a ping), or simply receiving information about a transmission speed from a client (for example, a connection type).

If access is requested by one client of the simultaneous access-granting group extracted by the extractor 125 (described below), the connection management controller 121 controls the connector 110 to transmit a download list, in which content body information is recorded, to the client of the simultaneous access-granting group. The content body information is information remaining after the exclusion of the content header information.

Additionally, if the download completion information on a data list is received from one client of the simultaneous access-granting group (i.e., one client finishes downloading content from the content server), the connection management controller 121 controls the extractor 125 to add, to the simultaneous access-granting group, a client having a high transmission speed from among clients not already included in the simultaneous access-granting group. Accordingly, the client having a high transmission speed may download content, and all of the clients 200-1, 200-2, 200-3, . . . , 200-N on the network sequentially download content. Therefore, efficient network traffic may be provided.

The arranging part 123 arranges the plurality of clients 200-1, 200-2, 200-3, . . . , 200-N in order of transmission speed based on the transmission speeds contained, for example, in the download completion information that is received through the connector 110. As stated above, it is understood that the transmission speeds may be determined according to other methods, such as a protocol (for example, a ping).

The extractor 125 extracts the simultaneous access-granting group from the arranged plurality of clients 200-1, 200-2, 200-3, . . . , 200-N based on a predetermined simultaneous access permission level. Specifically, on the basis of the simultaneous access permission level, the extractor 125 extracts clients as a simultaneous access-granting group until the sum of transmission speeds is less than or equal to the simultaneous access permission level, from among the plurality of the arranged clients. However, it is understood that according to other aspects, the extractor may extract clients as a simultaneous access-granting group according to other methods, such as a predetermined number of simultaneously allowable clients or an allowable range of transmission speeds at a given time (for example, a first simultaneous access-granting group including all clients having a transmission speed between 4 Mbps and 8 Mbps).

Figure 4:
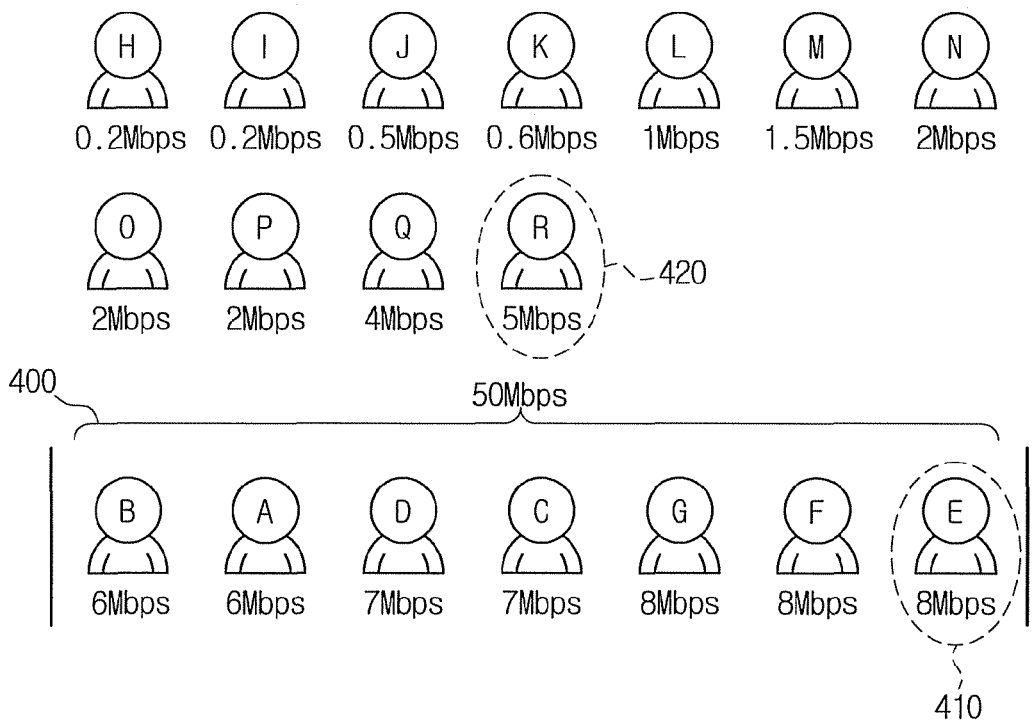
FIG. 4 is a view explaining a method of extracting a simultaneous access-granting group according to an embodiment of the present invention.

FIG. 4 is a view explaining a method of extracting a simultaneous access-granting group according to an embodiment of the present invention. FIG. 4 shows the plurality of clients in human form in order to explain a method of extracting a simultaneous access-granting group in the connection manager 120 illustrated in FIGS. 2 and 3.

Referring to FIG. 4, it is assumed that the simultaneous access permission level of the server is approximately 50 Mbps, and the highest transmission speed for each client is approximately 8 Mbps. Accordingly, a plurality of clients A to Q that request access to the server are arranged by the arranging part 123 according to the transmission speed of each client A to Q.

Additionally, the extractor 125 extracts clients, from among the plurality of arranged clients A to Q, until the sum of the transmission speeds of the extracted clients is less than or equal to the simultaneous access permission level. For example, a simultaneous access-granting group 400 is extracted by grouping clients in the order of client E (8 Mbps), client F (8 Mbps), client G (8 Mbps), client C (7 Mbps), client D (7 Mbps), client A (6 Mbps), and client B (6 Mbps). However, it is understood that according to other aspects, the extractor 125 may extract clients, from among the plurality of arranged clients A to Q, until the sum of the transmission speeds of the extracted clients exceeds the simultaneous access permission level (that is, until a client first increases the sum of the transmission speeds to be equal to or greater than the simultaneous access permission level).

Once a client contained in the simultaneous access-granting group 400 completes downloading content, the client having the highest transmission speed from among clients not included in the simultaneous access-granting group 400 may be added to the simultaneous access-granting group 400. For example, if client E 410 of the simultaneous access-granting group 400 has completed downloading content, client R 420 having the highest transmission speed among clients not included in the simultaneous access-granting group 400 may be added to the simultaneous access-granting group 400.

Accordingly, if content downloading is completed by the clients contained in the simultaneous access-granting group 400, the clients not included in the simultaneous access-granting group 400 may be added to the simultaneous access-granting group 400 to perform the above-described operations. Thus, the plurality of clients in the network may efficiently download content.

Figure 5:
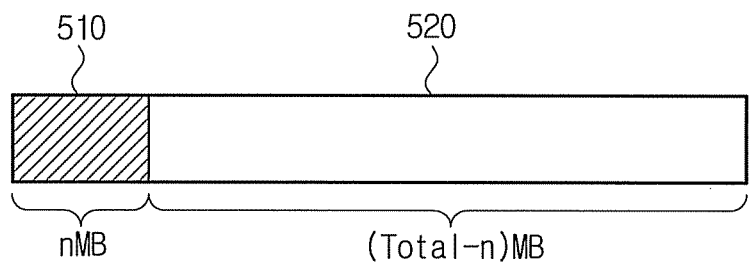
FIG. 5 is a view showing a data format of content according to an embodiment of the present invention.

FIG. 5 is a view showing a data format of content according to an embodiment of the present invention. Referring to FIG. 5, when the total amount of content to be downloaded by clients is indicated by Total MB, the content header information is indicated by a section 510 corresponding to n MB, and the content body information is indicated by a section 520 corresponding to (Total-n) MB. For example, if the total amount of content to be downloaded by clients is approximately 40 MB, the content header information is a section of approximately 400 KB, and the content body information is a section of approximately 39.6 MB. As the content header information of approximately 400 KB is only an example and aspects of the present invention are not limited thereto, the content header information may be changed by a designer.

Figure 6:
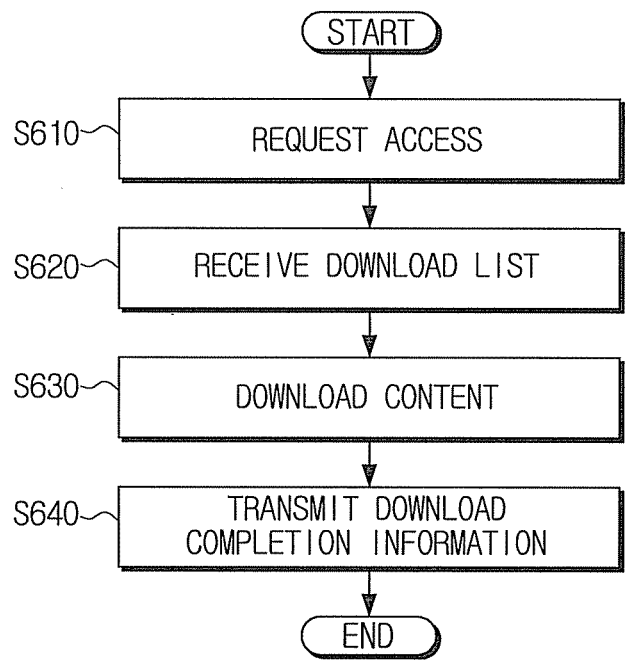
FIG. 6 is a flowchart explaining a content download method of a client according to an embodiment of the present invention.

FIG. 6 is a flowchart explaining a content download method of a client according to an embodiment of the present invention. Referring to FIG. 6, first, a client requests access to a server (operation S610), and receives a download list from the server (operation S620). The client may request access to the server periodically or randomly.

The client then downloads content from a content server based on the received download list (operation S630). Content header information and content body information are recorded in the download list. The download list may further include a content server address. The client may compare the previously received download list to the currently received download list and download only newly added content. As the download list currently received from the server may be an updated download list, the already downloaded content is not re-downloaded and only the added content is downloaded.

Subsequently, if content downloading is completed, the client may transmit download completion information to the server (operation S640). The client may measure the download transmission speed after downloading content, and add the measured transmission speed to download completion information to be transmitted to the server.

Figure 7:
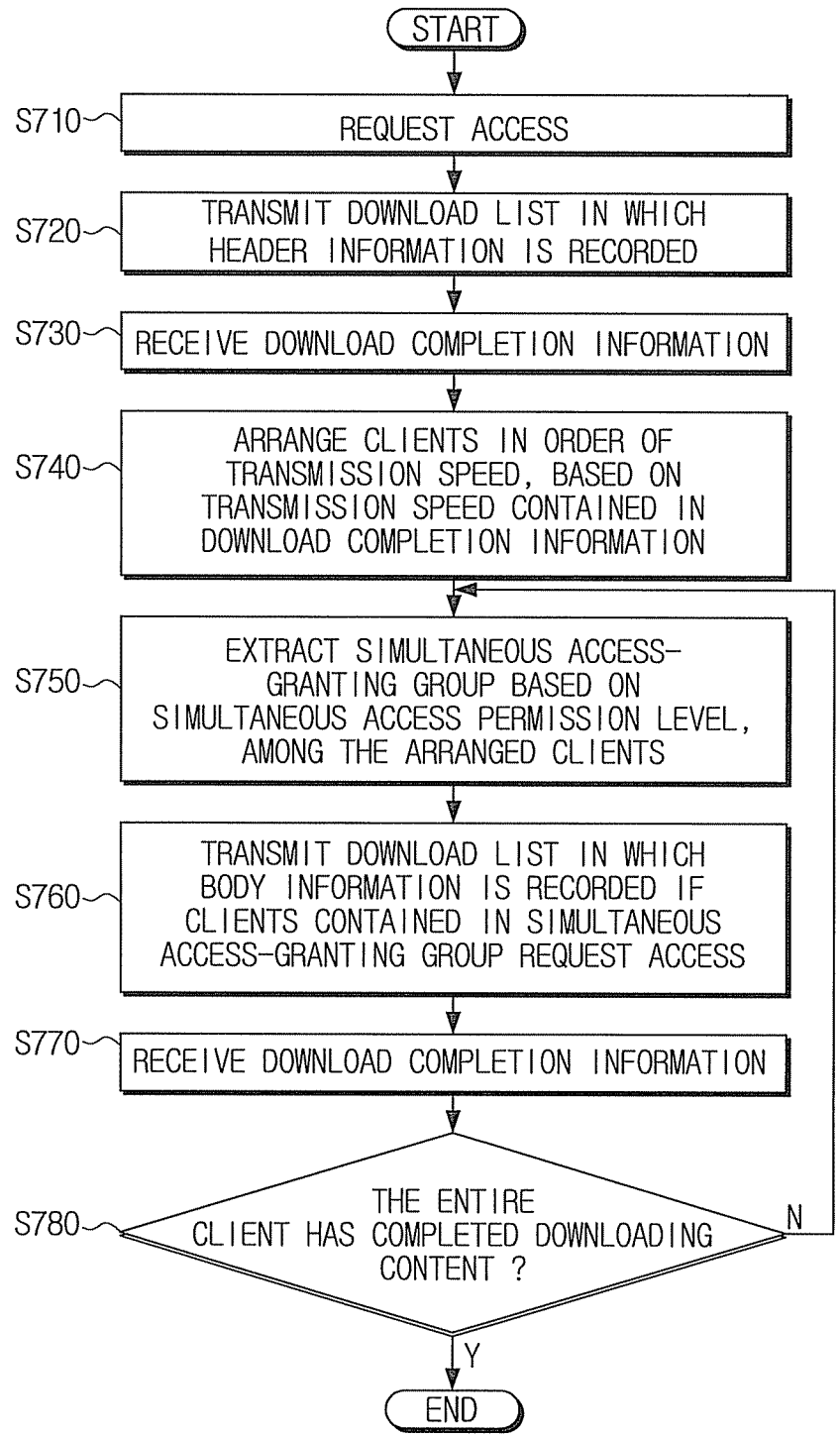
FIG. 7 is a flowchart explaining a simultaneous access control method of a server according to an embodiment of the present invention.

FIG. 7 is a flowchart explaining a simultaneous access control method of a server according to an embodiment of the present invention. Referring to FIG. 7, if the plurality of clients request access (operation S710), the download list in which the content header information is recorded may be transmitted to the plurality of clients (operation S720).

Next, if download completion information including a respective transmission speed is received from the plurality of clients (operation S730), the plurality of clients may be arranged in order of transmission speed based on the transmission speeds contained in the download completion information (operation S740).

Next, a simultaneous access-granting group is extracted from among the arranged clients based on a simultaneous access permission level (operation S750).

If the clients contained in the simultaneous access-granting group request access, the download list in which the content body information is recorded is transmitted thereto (operation S760).

When the download completion information is received from the clients contained in the simultaneous access-granting group (operation S770), it is determined whether all of the clients have completed downloading content (operation S780). If all of the clients have not downloaded content (operation S780: N), a client having a high transmission speed from among clients not included in the simultaneous access-granting group is added to the simultaneous access-granting group (operation S750). These operations are repeatedly performed until all of the clients have completed downloading content. Accordingly, efficient network traffic can be provided by distributing access to the plurality of clients.

As described above, according to aspects of the present invention, it is possible to provide efficient network traffic by distributing access to the plurality of clients. Additionally, content transmission can be efficiently managed without establishing a separate download server and increasing the network bandwidth. Furthermore, it is possible to reduce maintenance costs required to upgrade content.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A server comprising:
    a connector to receive and transmit data from/to a plurality of clients; and
    a connection manager to extract a simultaneously accessible client from among the plurality of clients, and to permit the extracted client access to download content when the plurality of clients request the access to download the content, wherein the connection manager comprises:
    a connection management controller to control the connector to transmit a first download list comprising header information of the content, to the plurality of clients, when the plurality of clients request the access, and to receive first download completion information that includes a transmission speed from each of the plurality of clients,
    wherein the transmission speed is measured according to a download time of one portion of a total content to be downloaded, based on the header information,
        an arranging part to order the plurality of clients according to the transmission speeds, and
        an extractor to extract a simultaneous access-granting group of clients, including a simultaneously accessible client, from the arranged plurality of clients based on a simultaneous access permission level,
    wherein the connection management controller controls the extractor to add to the simultaneous access-granting group a client having a high transmission speed from among clients not included in the simultaneous access-granting group, if download completion information, indicating that a downloading of the content is completed, is received from one client of the simultaneous access-granting group.

2. The server as claimed in claim 1, wherein the first download list includes information about only the one portion of the content allowing each of the plurality of clients to download the one portion of the content.

3. The server as claimed in claim 1, wherein the extractor extracts clients with a highest transmission speed from the arranged plurality of clients to be included in the simultaneous access-granting group of clients until a sum of the transmission speeds of the extracted clients is greater than or equal to the simultaneous access permission level.

4. The server as claimed in claim 1, wherein the connection management controller permits the access to the content by controlling the connector to transmit a download list, in which content body information is recorded, to the extracted simultaneous access-granting group of clients.

5. A simultaneous access control method of a server, the method comprising:
receiving an access request from a plurality of clients;
extracting a simultaneously accessible client from among the plurality of clients; and
permitting access by the extracted client to download content;
wherein the extracting of the simultaneously accessible client from among the plurality of clients comprises:
transmitting a first download list comprising header information of the content, to the plurality of clients, when the plurality of clients request access,
receiving first download completion information that includes a transmission speed from each of the plurality of clients,
wherein the transmission speed is measured according to a download time of one portion of a total content to be downloaded, based on the header information,
arranging the plurality of clients according to the transmission speeds;
extracting a simultaneous access-granting group of clients, including the simultaneously accessible client, from the arranged plurality of clients based on a simultaneous access permission level,
receiving download completion information, indicating that a downloading of the content is completed, from one client of the simultaneous access-granting group, and
adding to the simultaneous access-granting group a client having a high transmission speed from among clients not included in the simultaneous access-granting group.

6. The method as claimed in claim 5, wherein the first download list includes information about only the one portion of the content allowing each of the plurality of clients to download the one portion of the content.

7. The method as claimed in claim 5, wherein the extracting of the simultaneous access-granting group of clients comprises:
extracting clients with a highest transmission speed from the arranged plurality of clients to be included in the simultaneous access-granting group until a sum of the transmission speeds of the extracted clients is greater than or equal to the simultaneous access permission level.

8. The method as claimed in claim 5, wherein the permitting of the access comprises:
transmitting a download list, in which content body information is recorded, to the extracted simultaneous access-granting group of clients.

9. A simultaneous access control method of a server, the method comprising:
receiving an access request from a plurality of clients;
determining a transmission speed of each of the plurality of clients;
arranging the plurality of clients according to the transmission speeds; and
extracting a simultaneous access-granting group of clients from the arranged plurality of clients based on a simultaneous access permission level,
wherein the extracting of the simultaneous access-granting group of clients comprises:
transmitting a first download list comprising header information of the content to the plurality of clients,
receiving first download completion information that includes the transmission speed from each of the plurality of clients, wherein the transmission speed is measured according to a download time of one portion of a total content to be downloaded, based on the header information,
arranging the plurality of clients according to the transmission speeds,
extracting the simultaneous access-granting group of clients, including a simultaneously accessible client, from the arranged plurality of clients based on the simultaneous access permission level,
receiving download completion information, indicating that a downloading of the content is completed, from one client of the simultaneous access-granting group, and
adding to the simultaneous access-granting group a client having a high transmission speed from among clients not included in the simultaneous access-granting group.

* * * * *